P. KLUNZINGER.
CAR-BRAKE.

No. 170,379.

Patented Nov. 23, 1875.

2 Sheets—Sheet 1.

Attest:
Chas Thurman
R. N. Dyer

Inventor
Paul Klunzinger
by Geo. W. Dyer
Atty

2 Sheets—Sheet 2.

P. KLUNZINGER.
CAR-BRAKE.

No. 170,379.  Patented Nov. 23, 1875.

Attest:
Chas Thurman.
R. N. Dyer.

Inventor
Paul Klunzinger
by Geo. W. Dyer
Atty

UNITED STATES PATENT OFFICE.

PAUL KLUNZINGER, OF BELLINZONA, SWITZERLAND.

IMPROVEMENT IN CAR-BRAKES.

Specification forming part of Letters Patent No. 170,379, dated November 23, 1875; application filed October 8, 1875.

*To all whom it may concern:*

Be it known that I, PAUL KLUNZINGER, of Bellinzona, Switzerland, have invented an Improved Railway-Brake Apparatus, of which the following is a specification:

This invention relates to an improved construction of brake apparatus for the rolling-stock of railways, wherein the putting on of the brakes is effected by the weight or gravity of the vehicle, and the friction of the brake is thus proportioned to the load on the wheels. As the weight or gravity is always ready to act when it is left free to do so brakes worked in the manner which will be described become applied as soon as the levers which keep them off are released, and thus, in case of negligence on the part of the brakesman, whose duty it is usually to keep the brakes off, the letting go of the levers or connections by which he holds them off has the effect of putting the brakes on.

The accompanying sheets of drawings show various arrangements for carrying the said invention into practice.

Figure 1:
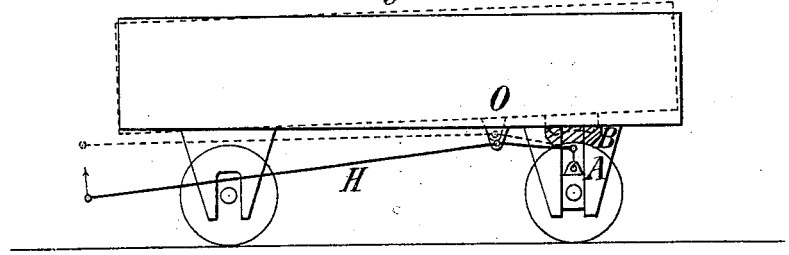
Figure 2:
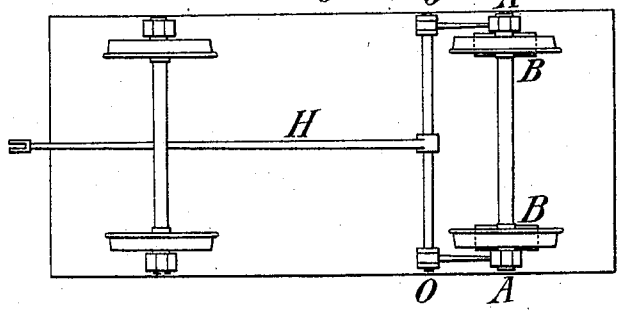
Figure 3:
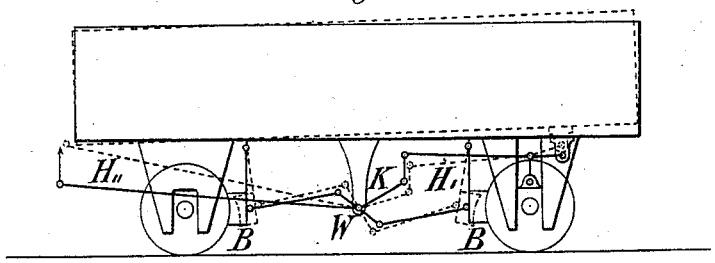
Figure 4:
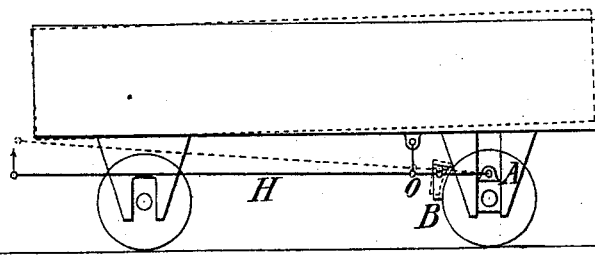

In Figure 1 a pair of brake-blocks, B, are fixed to the truck-frame over a pair of wheels, and a long lever, H, is pivoted at A on the axle-boxes of those wheels. As clearly shown in Fig. 2, which is a view from below of the vehicle and the brake apparatus applied thereto, the lever H is forked and connected, by pivots, to the lugs or brackets O, which are fixed to the truck-frame of the carriage. It is obvious that by lifting or lowering the end of the lever H the truck-frame may be raised or lowered, whereby, as the latter motions are also communicated to the brake-blocks, these blocks are either held off or put on the wheels for braking according to the requirements. The brake-blocks, instead of being fixed to the truck, may be fixed to a cross-bar or bracket connecting the two arms of the forked lever H, as indicated in Fig. 4. The latter being pressed down by the weight of the truck causes the blocks to bear with corresponding pressure on the wheels. Brake-blocks hung from the body of the vehicle, and moved, by connecting-rods, from arms on a transverse rocking-shaft, may be acted on according to this invention, as shown in Fig. 3 of the drawings. At Fig. 3 the long lever H″ is fixed to the brake-shaft W of the blocks B B, which is also connected to the crank K and lever H′, which is pivoted to the axle-box at A, and acted on by the weight of the truck or carriage at O. On raising the lever H″, as indicated by dotted lines in the figure, the end of the truck opposite to the outer end of lever H″ is raised and the brake-shaft W turned, so as to take the brake-blocks B off the wheels; but if the lever H″ is released the weight of the carriage acts on lever H′, so as to turn the crank K and brake-shaft in the opposite direction and apply the brakes to the wheels.

Figure 5:
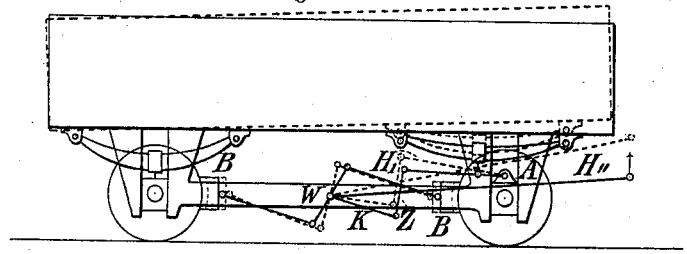

Fig. 5 illustrates the application of the principles of this invention to a carriage furnished with springs and brake-blocks mounted in the usual way, so as to slide. In this instance the axle-boxes on the sides of the vehicles are connected by iron frames, in which the brake-shaft W rests, and which contain the guides for the brake-blocks. The arrangement for raising and releasing the brake-blocks from the wheels is similar to that shown in Fig. 3. The levers H′ are pivoted, at A, to the axle-boxes, and the springs rest on these levers sidewise of the center of the axle-boxes, so that the weight of the vehicle and its load bears on the shorter arms of these levers H′. By means of the connecting-rods Z, attached to the longer arms of the levers H′, this pressure is transmitted to the crank K, and, by the brake-shaft W, to the brake-blocks B.

Figure 6:
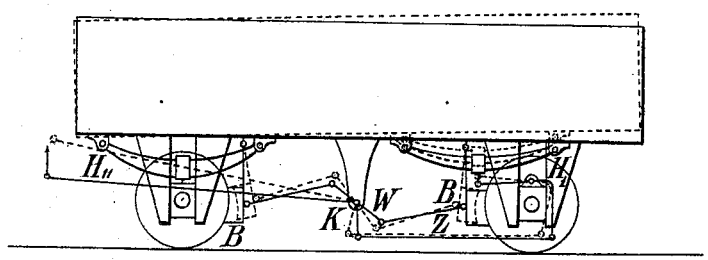

Fig. 6 shows a vehicle also furnished with springs and brake-blocks hung from the body of the truck. The weight of the truck and load, as in Fig. 5, is transmitted, by the springs, to the levers H′, which levers are also pivoted on the axle-boxes, and are in this case levers of the first kind. The longer arms of these levers are bent downward, as shown in the drawing, or may be bent upward; and the horizontal movements of the same are transmitted, as in the former case, by the nearly horizontal connecting-rod Z, to the crank K of the brake-shaft W, which is hung from the frame of the truck. On raising the lever H″ connected to the brake-shaft the brakes are taken off, and, as in the former cases, the same are applied when lever H″ is dropped or released.

Figure 7:
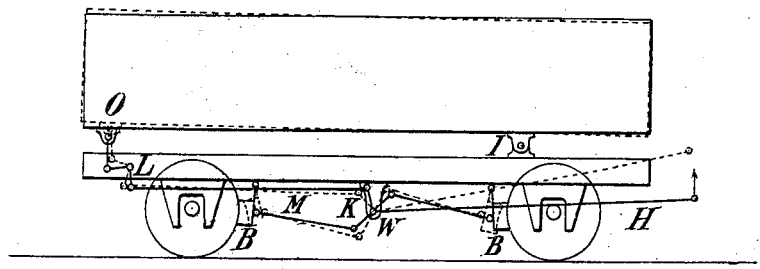

Fig. 7 shows the application of this brake system to a carriage with a separate upper and lower frame. The upper frame in this case is made to turn on a pivot, I, arranged at the side of the middle of the vehicle. The weight of the upper frame and of the load is transmitted to the crank K of the brake-shaft W by means of a bell-crank lever, L, and a connecting-rod, M. The brake-blocks B are hung from the lower frame and the application of the blocks to the wheels and the release of the same are effected by means of the long lever H, as described, with reference to the foregoing figures.

Figure 8:
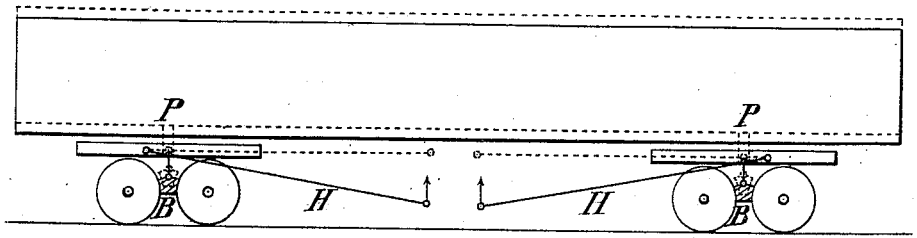

Fig. 8 shows a modification of this system applicable to eight-wheeled carriages or double bogies. The pivot P, on which the upper frame and the load of the wagon rests, is in this case made capable of being lifted sufficiently high by means of a long lever, H, the fulcrum of which is arranged on the lower frame toward the proper end of the wagon. The brake-blocks B are attached in suitable manner to the lower end of this pivot P, and by the above-mentioned means the pivot may be raised or lowered, and thus the blocks brought in or out of acting contact with the wheels.

Should there be only one brake-wagon in the train, the lever H or H″ is raised or lowered by hand for taking off and putting on the brakes, either directly or by means of an auxiliary lever or rope or chain passing over a pulley; but if two or more brake-wagons are in the train the levers H or H″ may all be connected to a rope or chain passing over guide-rollers to a winding apparatus under control of the brakesman, the winding apparatus being, by preference, so arranged that it will not lock, so that unless it is held by the brakesman it will unwind, so as to cause the brakes to be applied, and the brakesman is thus always obliged to give his attention to the brakes. The power required to hold the winding apparatus being very trifling the brakesman can easily stand the continuous work.

Having thus described the nature of the said invention, and in what manner the same is to be performed, I claim—

In a railway-brake apparatus, a lever, H, or a system of levers, H H′, pivoted to the under side of the car-frame, and also to the truck-frame or axles, with a free end adapted to be raised by the brakesman upon the car, for the purpose of employing the weight of the car, when the free end of the lever is released, to apply the brake-blocks to the wheels, substantially as described and shown.

PAUL KLUNZINGER.

Witnesses:
JOHANN WIMBERSKY,
GIOVANNI BONDI.